United States Patent [19]

Greten

[11] 4,307,050

[45] Dec. 22, 1981

[54] HEATED PLATTEN PRESS

[75] Inventor: Berndt Greten, Springe, Fed. Rep. of Germany

[73] Assignee: Bison-Werke Bähre & Greten GmbH & Co. KG, Fed. Rep. of Germany

[21] Appl. No.: 215,261

[22] Filed: Dec. 11, 1980

[30] Foreign Application Priority Data

Dec. 14, 1979 [DE] Fed. Rep. of Germany ....... 2950441

[51] Int. Cl.[3] .......................... B29C 3/06; B30B 15/24; B29J 5/04

[52] U.S. Cl. .................................. 264/40.5; 425/141; 425/150

[58] Field of Search ................. 425/140, 141, 150, 78; 264/40.5

[56] References Cited

U.S. PATENT DOCUMENTS

| | | | |
|---|---|---|---|
| 2,509,783 | 5/1950 | Richardson | 425/78 |
| 2,562,876 | 8/1951 | Balza | 425/78 |
| 3,191,232 | 6/1965 | Haller | 425/78 |
| 3,640,660 | 2/1972 | De Mets | 425/140 |
| 3,881,852 | 5/1975 | Ahriveiler | 425/150 X |
| 4,164,387 | 8/1979 | Schermutzki et al. | 425/141 X |
| 4,269,580 | 5/1981 | Wright | 425/150 |

*Primary Examiner*—J. Howard Flint, Jr.

[57] ABSTRACT

A heated platten press for the manufacture of particle board features a pair of heatable press plattens 1 and 2 which are located between relatively movable press beams. The platten 1 is constructed as a rigid platten to define a flat reference surface for one side of the board to be pressed and is constructed so that it does not deflect either mechanically or thermally during operation of the press. The second press platten 2 is constructed to be elastically deflectable and is supported on a plurality of individual piston-in-cylinder arrangements 4 forming an array of adjacent substantially contiguous support fields which are substantially uniformly distributed over the whole area of the compensation platten. In operation a board is pressed and the deviation in thickness of the board from the nominal thickness is measured at points corresponding to the positions of the piston-in-cylinder arrangements within the array. The measured deviations are then used to control the individual piston-in-cylinder arrangements so as to correct the deviations in thickness.

13 Claims, 3 Drawing Figures

HEATED PLATTEN PRESS

FIELD OF THE INVENTION

Figure 1:
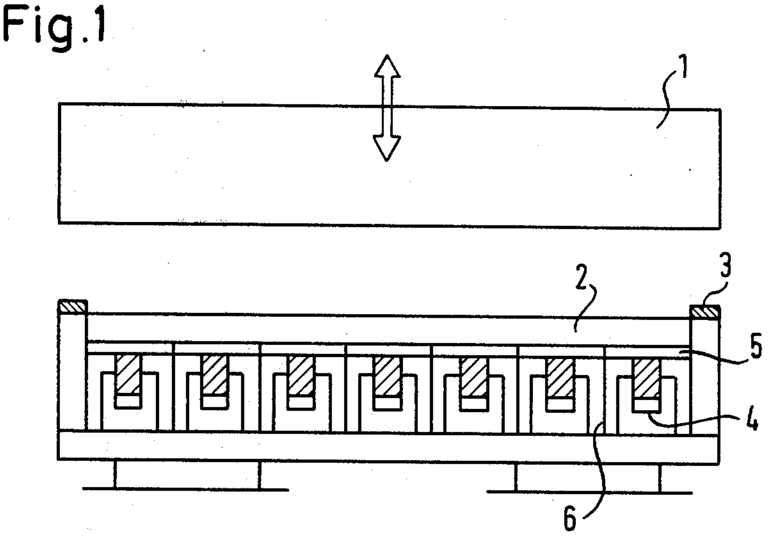

The invention relates to a heated platten press of the type used to manufacture wooden particle boards by the application of heat and pressure to a mat of particulate material including a heat curable binder.

BACKGROUND TO THE INVENTION

In known heated platten presses of this type, which are generally used for the manufacture of chip boards, fibre boards or the like, it proves difficult to produce boards of uniform thickness. This difficulty arises for a number of reasons.

Firstly the particulate material which is initially scattered to form the mat is not always uniformly scattered so that variations in density are present in the loosely scattered mat The loosely scattered mat is usually subjected to a prepressing operation before it is introduced into the heated platten press and the aforementioned density variations are present in the prepressed mat. Furthermore, deformation of one or both of the press plattens can also occur as a result of the loads imposed by the high press pressure and also as a result of the thermal deflection which are brought about by the high operating temperatures.

The resulting inaccuracies in thickness are troublesome because they have to be removed by subjecting the surfaces of the pressed boards to a grinding process in order to achieve the required plane parallelism. This grinding procedure gives rise to high grinding losses which are undesirable for economic reasons.

Accordingly many attempts have been made to overcome the outlined problems, which arises with heated platten presses, by overdimensioning the parts which are in danger of deforming or deflecting. It is indeed possible in this way to improve the thickness tolerances of the pressed material. However, the overdimensioning of the press plattens leads to unnecessary expense and complication, and to a general overall increases in the size of the actuation mechanism etc., which can result in the press becoming economically and technically unattractive.

Attempts have been made to reduce the deformations which occur as a result of thermal expansions by the provision of canal systems for the throughflow of heating and/or cooling media in the press plattens. These systems are, however, unnecessarily complex and, in the final analysis, are insufficient to allow the consistent manufacture of particle boards of uniform thickness.

An arrangement is also known which incorporates a rigid lower press platten and a len rigid upper press platten. In this arrangement the rigid press platten is fixed and the upper press platten is advanced towards the rigid press platten by means of hydraulic actuating cylinders so as to effect initial closure of the press. Further piston-in-cylinder arrangements are then provided at the centre of the upper press platten and are actuated so as to counteract the load dependent bowing and the centre of the deformable platten. This known construction does not however make it possible to take account of the small area thickness variations which arise as a result of non-uniform scattering of the mat and only allow an improvement of the inaccuracy introduced into the pressed board as a result of bowing deflection of the upper press platten.

OBJECTS OF THE PRESENT INVENTION

The principal object underlying the present invention is to provide a heated platten press which enables the manufacture of dimensionally stable boards, which satisfy strict accuracy requirements with regard to their thickness, and which no longer need to be ground to finished size.

A further object of the present invention is to provide a heated platten press which allows fine compensation within the press of both deformations which arise on mechanical and thermal grounds and thickness variations in the finished board which arise from non-uniform scattering of the mat.

A yet further object of the present invention is to provide an improved method of manufacturing particle boards which enables continuous correction of variations in board thickness as manufacture proceeds.

It is also an object of the present invention to provide a heated platten press which allows the above objects to be satisfied by simple means and without resulting in an unduly complex arrangement.

Further objects underlying the present invention will become clear from the following disclosure.

BRIEF DESCRIPTION OF THE INVENTION

According to the present invention there is provided a heated platten press, in particular for the manufacture of wooden particle boards such as chip boards, fibre boards or the like, by the application of heat and pressure to a mat of particulate material including a heat curable binder, the platten press comprising a first press beam, a second press beam movable relative to the first press beam by means of an actuation device, at least one pair of heatable press plattens provided between said first and second press beams, with a first one of said pair of press plattens being a rigid platten, and the second one of said pair of press plattens being a resiliently deflectable compensation platten which is additionally braced against an associated one of said press beams by a plurality of piston-in-cylinder arrangements disposed between the compensation platten and said associated press beam, with said piston-in-cylinder arrangements forming an array of adjacent substantially contiguous support fields which are substantially uniformly distributed over the whole area of the compensation platten, and wherein the individual piston-in-cylinder arrangements which are each associated with one of the support fields are individually controlled in dependence on a thickness measuring device which is associated therewith and in dependence on the heating up time of the mat.

Also according to the present invention there is provided a method of manufacturing particle boards by pressing a mat of particulate material including a heat curable binder in a heated platten press, the method comprising the steps of providing a heated platten press with a first rigid platten and a second elastically deformable compensation platten supported on an array of piston-in-cylinder arrangements to form a plurality of uniformly distributed continuous support fields for one side of said mat; initially pressing a mat to form a particle board by producing relative closing movement of the press plattens to an end separation substantially equal to the thickness of the desired particle board; measuring the thickness of the board; either directly outside the press or indirectly inside the press, at positions corresponding to the positions of the piston-cylinder arrangements within the array; deriving the deviation of the board thickness at each of the said positions from the desired board thickness; pressing a second mat and, after a period sufficient to allow the mat to soften through initial heating, controlling the individual piston-in-cylinder arrangements to deflect the compensation platten to correct the said deviations in board thickness derived from the first mat and repeating the measurement and correction steps for further mats as manufacture proceeds.

The basic thought underlying the invention can thus be seen in the combination of a rigid platten, constructed to avoid any deflection so as to form an accurately defined reference surface, with a compensation platten which is consciously made elastically deformable. In this way, when the mat to be pressed, has been non-uniformly scattered, the compensation platten can yield during closing of the press in the period before the mat becomes formable and resilient due to initial warming up of the mat and the curable resin binder. After a predetermined warming up time of the mat additional pressure can be exerted over individual fields of the array of piston-in-cylinder arrangements to correct the deflection of the compensation platten. As this additional pressure is applied at a specified time, when the mat has been rendered formable as a result of the intentional heating that has taken place, the reaction forces occurring during the additional pressing stages are now comparatively small so that these forces cannot bring about any deformation within the press. As a result of the small area of each of the support fields it is possible to achieve an accurate fine compensation which leads to a satisfactory finished product.

The heating up time dependent control of the piston-in-cylinder arrangements takes precedence over the tolerance dependent control with the initiation of the tolerance dependent control taking place approximately in the region of half of the total heating up time of the mat.

In this way it is ensured that the compensation platten can deflect during the intervals when the material to be pressed is not yet formable and resilient, whereas, the thickness compensation using of the piston-in-cylinder arrangements can be particularly simply and accurately effected after the material to be pressed has been sufficiently heated because of the reduced counterforces.

It is also advantageous to use a frame plate with an array of webs for the compensation platten with a piston-in-cylinder arrangement being provided in each field of the array. The resulting large area compensation array is particularly suitable for carrying out the compensation steps by reason of the presence of stiff webs and resilient intermediate regions.

In accordance with one variant of the invention a measuring device can be associated with each piston-in-cylinder arrangement with the measuring device controlling the supply of pressure fluid to the respective piston-in-cylinder arrangement during the compensation phase. It is however also possible, and for many applications actually particularly advantageous, for the measuring device to be provided outside the heated press. For this purpose, and in accordance with a preferred embodiment of the invention, the measuring devices are arranged in the form of measuring head pairs in a transverse row outside the press on a stable torsionally stiff cross beam, with the number of measuring head pairs corresponding to the number of piston-in-cylinder arrangements in the transverse direction of the press. In this embodiment the measuring heads are connected to a measured value memory for storing values of thickness, or deviation from nominal thickness, as measured by the measuring heads at sequential intervals along the pressed board. The total number of stored values, which are measured at intervals of distance travelled by the board rather than at intervals of time, are equal to the number of piston-in-cylinder arrangements. The above embodiments are based on the assumption that irregularities occurring in the scattered mat always repeat in similar manner so that these scattering irregularities can be taken into account during initial operation of a plant, by taking measurements from the previously manufactured board in the described manner and then appropriately controlling the piston-in-cylinder arrangements provided in the press in dependence on the measured values.

Figure 2:
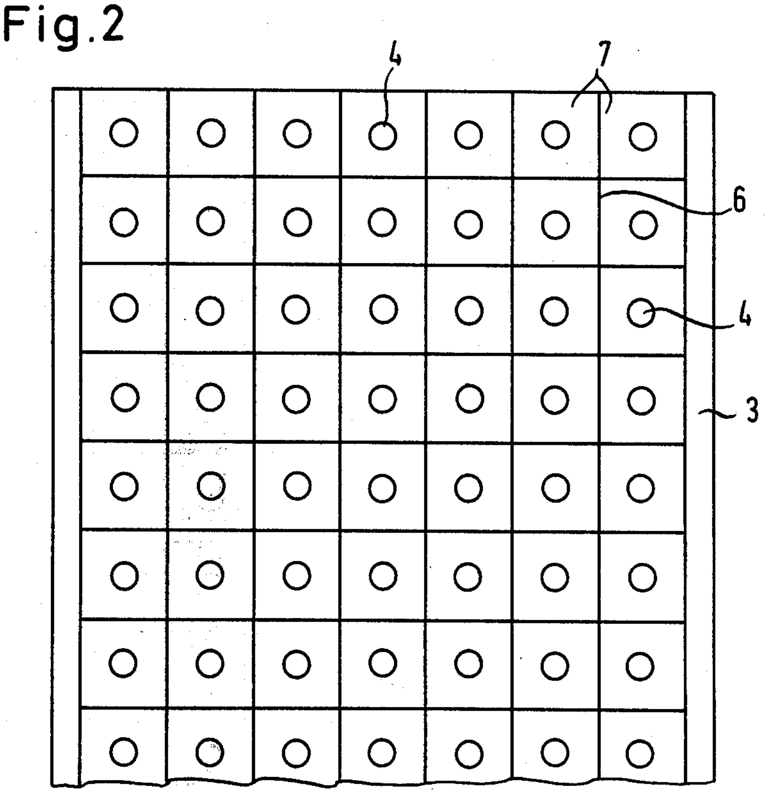
Figure 3:
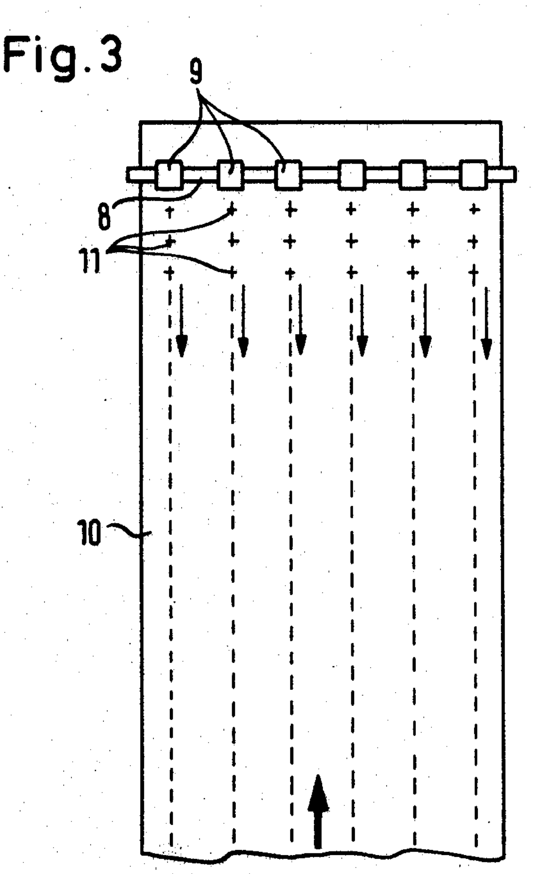

The inventiion will now be described in more detail by way of example only and with reference to the specific embodiment illustrated in the accompanying drawings which show:

FIG. 1 a highly schematic representation of the principles of a heated platten press constructed in accordance with the invention, FIG. 2 a plan view of the compensation platten array of the press of FIG. 1 and FIG. 3 a schematic representation to explain the derivation of measured values which takes place outside the press.

The schematic representation of FIG. 1 shows a rigid platten 1 which can accept the press pressure without deflection and which is actuated via appropriate press cylinders which are not shown in the drawing. The detail of the rigid plate is not shown as it can be constructed and heated in accordance with known techniques in order to ensure the required freedom from deflection.

A lower press platten 2, which is elastically deformable and supported by an array of at least substantially uniformly distributed piston-in-cylinder arrangements 4, is associated with the deflection free upper press platten 1. This elastically deformable press platten 2 usefully consists of a frame plate with an array of webs with a respective piston-in-cylinder arrangement 4 being arranged in each of the resulting fields 7 of the array (see FIG. 2). The piston-in-cylinder arrangements and the associated regions of the compensation plate can be thought of as a series of adjacent, at least substantially contiguous support fields which cooperate to support the whole of one side of a mat located in the press.

In order to ensure a uniform transmission of force from the piston-in-cylinder arrangements to the compensation platten 2 respective pressure distribution plates 5, which are each guided between the webs 6, are provided between the pistons and the platten 2. Spacer strips 3 are arranged between the press plattens 1 and 2 in order to determine the end thickness of the boards that are to be manufactured.

The piston-in-cylinder arrangements 4 are relatively small units which are however used in larger numbers in order to guarantee small area compensation.

In practical operation the press can be closed, either continuously or in steps until the rigid platten contacts the spacer strips and it is of particular significance that the piston-in-cylinder arrangements are controlled in such a way that they can only begin to execute their compensation movements in dependence on the thickness variations that have occurred when the mat to be pressed has been heated for a predeterminable time. The objects underlying the invention can only be satisfied if the selective small area corrections are carried out at the right time, i.e. when the mat is hot enough to be formable and before the curing of the resin binder reaches an advanced stage. The compensation pressures can normally be applied to the mat after the elapse of approximately one half of the total heating up time of the mat.

The measuring devices necessary to determine the deviations in thickness can be provided inside the press and each associated with one piston-in-cylinder arrangement. Alternatively, in accordance with a variant of the invention, a thickness measuring system can be provided outside of the heating press and the control of one or more piston-in-cylinder arrangements of the many piston-in-cylinder arrangement of the whole array can be carried out in dependence on the values measured by this external system.

FIG. 3 shows a thickness measuring system of this kind arranged outside of the press and having six measuring head pairs 9 which are mounted on a torsionally stiff cross beam 8. A thickness measuring system of this kind is preferably mounted approximately one board length behind the press in front of a revolving cassette store which is used to hold the pressed boards while they cool down. The board which is to be measured and which leaves the press has to be slowed down, stopped and, as a result of different formats, eventually positioned in front of the thickness measuring system. The board is then fed at a predeterminable speed through the thickness measuring system so that the registration of measured values takes place in dependence on travel, and not in dependence on time, as the board passes through the thickness measuring system. In the illustrated embodiment a series of measurements are taken in each of six rows. The spacing and positions at which the individual measurements are taken correspond exactly with the spacing and positions of the piston-in-cylinder arrangements in the press.

The measurements, and the logging of the results, is accordingly carried out so that, after the board has passed through the system, one measured value is available for the position of each piston-in-cylinder arrangement. The measured values that are obtained, which can also be printed out, make it possible to adjust the accuracy of the pressed boards to an optimum during the running in time of the plant. It will be appreciated that the measurements could, if necessary, also be carried out by hand. An operator could also adjust the controls for the invidual cylinders manually to take account of the measured deviations in thickness.

If different board formats are to be manufactured then care must be taken during a change of format that the measured valued determined by the thickness measuring system can each be associated with the correct piston in cylinder arrangement. In order to ensure this the rear edge of the board is always used as the reference line because this rear edge always lies in the same position even for different formats in the press.

It will be appreciated that the deviations in thickness measured at each station along and across the pressed board can readily be used in an automatic installation to control the piston-in-cylinder arrangements. In a typical installation the measured deviations will be stored in an updatable memory. Control signals corresponding to each item of information in the memory are then passed to respective valves controlling the supply of hydraulic fluid to the individual piston-in-cylinder arrangements. In order to ensure that the piston-in-cylinder arrangements are only actuated at the correct time a second control signal is passed to each of the valves and only allows the valves to respond to the control signals from the measured value memory once a sufficient period of time has elapsed, for the reasons outlined above. The valves connecting the individual piston-in-cylinder arrangements to the source of pressurized hydraulic fluid can be electrically controlled valves and can be connected to receive the two signals via an AND-gate. In this arrangement each of the AND-gates is designed to pass the signal received from the measured value memory, if necessary after suitable amplification or modulation, only when the necessary time signal is present at its other input.

It is particularly convenient if a central indicator keyboard is associated with the measured value memory. In an arrangement of this kind a key and indicator lamp is provided in the indicator keyboard for each piston-in-cylinder arrangement in the press. In addition, several luminescent diodes can be associated with each key with the luminescent diodes being controlled from the values measured by the thickness measuring system after a board has passed therethrough. The luminescent diodes can be arranged to show whether or not the board is too thick or too thin. The required control of the individual piston-in-cylinder arrangements can then be effected via this indicator keyboard.

I claim:

1. A heated platten press, in particular for the manufacture of wooden particle boards such as chip boards, fibre boards or the like, by the application of heat and pressure to a mat of particular material including a heat curable binder, the platten press comprising a first press beam, a second press beam movable relative to the first press beam by means of an actuation device, at least one pair of heatable press plattens provided between said first and second press beams, with a first one of said pair of press plattens being a rigid platten, and the second one of said pair of press plattens being a resiliently deflectable compensation platten which is additionally braced against an associated one of said press beams by a plurality of piston-in-cylinder arrangements disposed between the compensation platten and said associated press beam, with said piston-in-cylinder arrangements forming an array of adjacent substantially contiguous support fields which are substantially uniformly distributed over the whole area of the compensation platten, and wherein the individual piston-in-cylinder arrangements which are each associated with one of the support fields are individually controlled in dependence on a thickness measuring device which is associated therewith and in dependence on the heating up time of the mat.

2. A heated platten press in accordance with claim 1 and wherein each of said piston-in-cylinder arrangements is controlled by two signals, a first signal which enables actuation of the piston-in-cylinder arrangement in dependence on the elapsed heating up time of the mat and a second signal which controls the movement of the piston-in-cylinder arrangement in dependence on the measured thickness with said first control signal taking precedence over said second control signal.

3. A heated platten press in accordance with claim 2 and wherein said first control signal enables the application of said second control signal after the elapse of approximately one half of the total heating up time of the mat.

4. A heated platten press in accordance with claim 1 and wherein spacer strips are arranged between each pair of press plattens and wherein the time interval necessary for closure of the press until the press plattens contact the spacer strips is chosen to be small in comparison to the total heating up time of the mat.

5. A heated platten press in accordance with any one of claims 1 to 4 and wherein, inside the press, a respective measuring device is associated with each piston-in-cylinder arrangement with each measuring device controlling the supply of pressure fluid to the associated piston-in-cylinder arrangement during a compensation phase after initial warming of the mat.

6. A heated platten press in accordance with claim 1 and wherein the compensation platten is so dimensioned that it can at least withstand the normal pressure occurring when the mat to be pressed has been uniformly scattered, substantially without deflection and without support from the array of piston-in-cylinder arrangements.

7. A heated platten press in accordance with claim 1 and wherein the compensation platten is so dimensioned that it can withstand without deformation the normal pressure occurring when the mat to be pressed has been uniformly scattered only with support by the array of piston-in-cylinder arrangements.

8. A heated platten press in accordance with claim 1 and wherein at least the compensation platten consists of a frame plate with an array of webs, with one piston-in-cylinder arrangement being provided in each field of the array.

9. A heated platten press in accordance with claim 8 and wherein a respective pressure distribution plate is arranged between each piston-in-cylinder arrangement and the compensation platten with the dimensions of each said pressure distribution plate corresponding at least substantially to the size of a field of the array.

10. A heated platten press in accordance with claim 1 and wherein said thickness measuring devices comprise a transverse row of pairs of measuring heads disposed outside of the press with the number of measuring head pairs corresponding to the number of piston-in-cylinder arrangements provided in the transverse direction of the press and wherein a series of measurements are taken at positions along the board in dependence on the distance of travel of the board through said measuring head pairs with the number of said measurements corresponding to the total number of operative piston-in-cylinder arrangements in said press.

11. A heated platten press in accordance with claim 10 and wherein the values derived from said measurement are stored in an updatable measured value memory.

12. A heated platten press in accordance with claim 11 and wherein an indicator keyboard is associated with the measured value memory with one key and indicator light corresponding to each piston-in-cylinder arrangement.

13. A method of manufacturing particle boards by pressing a mat of particulate material including a heat curable binder in a heated platten press, the method comprising the steps of providing a heated platten press with a first rigid platten and a second elastically deformable compensation platten supported on an array of piston-in-cylinder arrangements to form a plurality of uniformly distributed contiguous support fields for one side of said mat; initially pressing a mat to form a particle board by producing relative closing movement of the press plattens to an end separation substantially equal to the thickness of the desired particle board; measuring the thickness of the board; either directly outside the press or indirectly inside the press, at positions corresponding to the positions of the piston-in-cylinder arrangements within the array; deriving the deviation of the board thickness at each of the said positions from the desired board thickness; pressing a second mat and, after a period sufficient to allow the mat to soften through initial heating, controlling the individual piston-in-cylinder arrangements to deflect the compensation platten to correct the said deviations in board thickness desired from the first mat, and repeating the measurement and correction steps for further mats as manufacture proceeds.

* * * * *